INVENTORS M.H. CROWELL
J.A. MORTON
BY Roderick B. Anderson
ATTORNEY

United States Patent Office 3,428,850
Patented Feb. 18, 1969

3,428,850

CATHODE RAY STORAGE DEVICES

Merton H. Crowell, Morristown, and Jack A. Morton, South Branch, N.J., assignors to Bell Telephone Laboratories, Incorporated, Murray Hill, N.J., a corporation of New York Filed Sept. 12, 1967, Ser. No. 667,167
U.S. Cl. 315—12 16 Claims
Int. Cl. H01j 29/41

ABSTRACT OF THE DISCLOSURE

The target structure of a cathode ray storage tube comprises a semiconductive sheet upon which is defined an array of $PNN^+$ semiconductor elements, only the P and $N^+$ regions of which are exposed to the electron beam. During its scan, an intensity modulated "write-in" electron beam selectively switches the voltages of the elements from a "0" to a "1" state, depending on the beam modulation at impingement. After a complete scan by the write-in beam, the spatial distribution of switched semiconductor elements constitutes a recording of a single transmitted frame. A "read-out" beam generates a pulse output from the N substrate only if the semiconductor element is in the "1" state. Another embodiment is a light sensitive camera tube in which light that exceeds a threshold intensity switches selective elements for write-in.

*Background of the invention*

A major obstacle to the transmission of document information by telephone-television systems is the large bandwidth ordinarily required for giving appropriately high resolution. However, while television reproduction of printed documents requires a high resolution for good legibility, its requirements for animation and several grey-levels are minimal. Thus, characters on most printed documents can be transmitted and reproduced by a television system that discriminates only between black and white without reproducing intervening shades of grey, and with a much lower frame rate than that required for animated face-to-face television. It is therefore possible to increase the resolution of television systems designed for the transmission of information on documents by increasing the number of lines per frame in the camera and display devices while sacrificing animation and varying grey levels, thereby keeping bandwidth requirements within specified limits.

As is described, for example, in the copending application of M. H. Crowell, Ser. No. 565,285, filed July 14, 1966 and assigned to Bell Telephone Laboratories, Incorporated, low frame rate transmission systems generally require devices for storing and successively displaying each transmitted frame a number of times to give satisfactory picture reproduction free of noticeable light pulsations known as flicker. For example, to minimize bandwidth requirements, document information may be transmitted at 2 frames per second, but each frame should then be reproduced thirty times to give the 60-frame per second rate required for eliminating flicker. Tubes for storing each incoming frame for subsequent display should be simple and inexpensive, and, as pointed out in the Crowell application, it is particularly desirable that they be capable of "non-destructive read-out"; i.e., multiple reproduction of each frame stored in a single storage tube.

Since the requirements for document transmission and reproduction are unique, it is anticipated that for some telephone-television systems, separate camera devices will be desirable for recording and transmitting document information. As mentioned before, such special purpose camera tubes need not reproduce different shades of grey, and may transmit information at a lower frame rate than conventional television camera tubes. The copending application of T. M. Buck et al., Ser. No. 605,715, filed Dec. 29, 1966, and assigned to Bell Telephone Laboratories, Incorporated, describes in detail the desirability in telephone-television systems of camera tubes having target structures of high reliability, resistance to deterioration from over-exposure to light and electron beam impingement, and compatibility with electron tube outgassing procedures.

*Summary of the invention*

Accordingly, it is an object of this invention to provide a storage tube for storing a television frame containing information suitable for the high-resolution reproduction of black and white characters of a document.

It is an object of one embodiment of this invention to provide a camera tube that is suitable for recording and transmitting information representative of black and white characters of a document.

These and other objects of the invention are attained in an illustrative embodiment thereof comprising a cathode ray storage tube having as a target structure a sheet largely of N-type semiconductor material including on one surface an array of localized P and $N^+$ regions. Each pair of adjacent P and $N^+$ regions forms together with the N substrate a $PNN^+$ semiconductor triode element which is biased, as shall be explained later, to be bistable. One stable condition, which will be referred to as the "0" state, is characterized by a rather high $NN^+$ junction resistance and relatively large voltages on the P-type emitter and $N^+$ collector with respect to the N-type substrate. If minority carriers, or holes, are injected into the N region at a sufficient rate, the resistance of the corresponding $NN^+$ junction is reduced, and the voltages of the P and $N^+$ regions change drastically to values that are nearer the substrate voltage. These voltages are also stable and constitute a "1" voltage state.

In the storage tube embodiment, an image is stored on the target structure by scanning it with an intensity modulated electron beam containing the information to be recorded. The semiconductor elements are initially biased at the "0" stable voltage state. The parameters of the device are selected such that when a beam modulated to be of high intensity impinges a P region it drives the voltage of the region positively, thereby injecting holes into the substrate and switching the element to the "1" state. A lower intensity beam does not affect the "0" state of an element it impinges. By thus selectively switching the elements it scans, the beam records an image or frame on the target structure storage medium.

The recorded image is read out by scanning the target with a beam designed to impinge on only the "1" state semiconductor elements to generate an output pulse; no output pulse is generated as the beam scans an element in the "0" state. The resulting pulsed output is used to modulate the beam of a cathode ray display tube that displays the image without variable intensity (only two grey levels) as is suitable for document reproduction. The read-out is non-destructive; hence, each stored frame can be displayed many times.

The camera tube embodiment has a target structure that is basically the same as that described above. The N substrate, however, is then enough to permit substantial diffusion across its width and the surface of the substrate opposite the target surface is exposed to incoming light. Light on a specific location which exceeds a threshold intensity produces holes in the N region which diffuse to the $NN^+$ junction at a sufficient rate to trigger the element to the "1" state. The stored voltages on the element are then read-out as before by electron beam scanning. This embodiment and the frame repeating storage tube embodiment are intended only to be illustrative of the inventive principles; as will become clear later, the invention can be embodied in numerous other devices.

*Drawing description*

These and other objects and features of the invention will be better understood from the consideration of the following detailed description taken in conjunction with the accompanying drawing in which.

*Detailed description*

Figure 1:
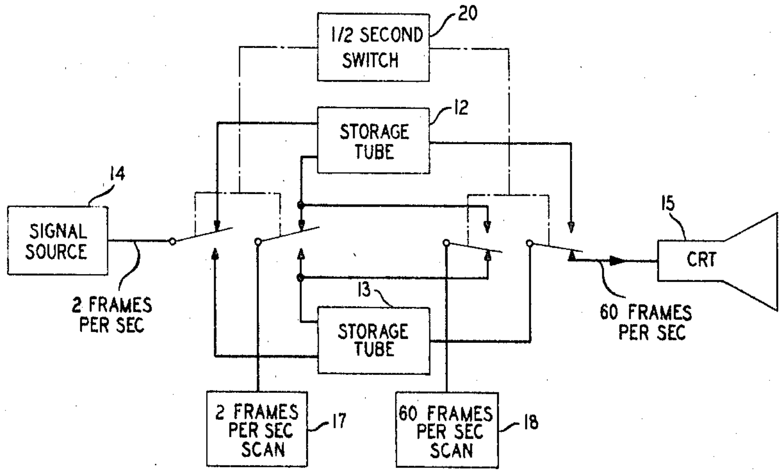
FIG. 1 is a schematic diagram of a television receiver station utilizing storage tubes in accordance with an illustrative embodiment of the invention.

Referring now to FIG. 1, there is shown, for illustrative purposes, a television receiving station comprising two video storage tubes 12 and 13, of the kind to be discussed in detail below, for storing a 2-frame per second video signal from a source 14 and converting it to a 60-frame per second signal for display by a cathode ray display tube 15. An input circuit to each tube includes the signal source 14 and a 2-frame per second deflection control device 17. An output circuit for each tube includes the cathode ray tube 15 and a 60-frame per second deflection control device 18. The storage tubes are switched between the input and output circuits each half second by a switch control 20, such that while one of the storage tubes is connected to the output circuit the other is connected to the input circuit.

In the condition shown in FIG. 1 the storage tube 12 is connected to the input circuit and the storage tube 13 is connected to the output circuit. During the one-half second switching interval, a single frame is recorded in storage tube 12, and simultaneously, thirty frames of an image previously stored in tube 13 are read out from tube 13 and successively displayed by display tube 15. As mentioned before, transmission at a low frame rate reduces bandwidth requirements while high frame rate reproduction eliminates flicker.

Figure 2:
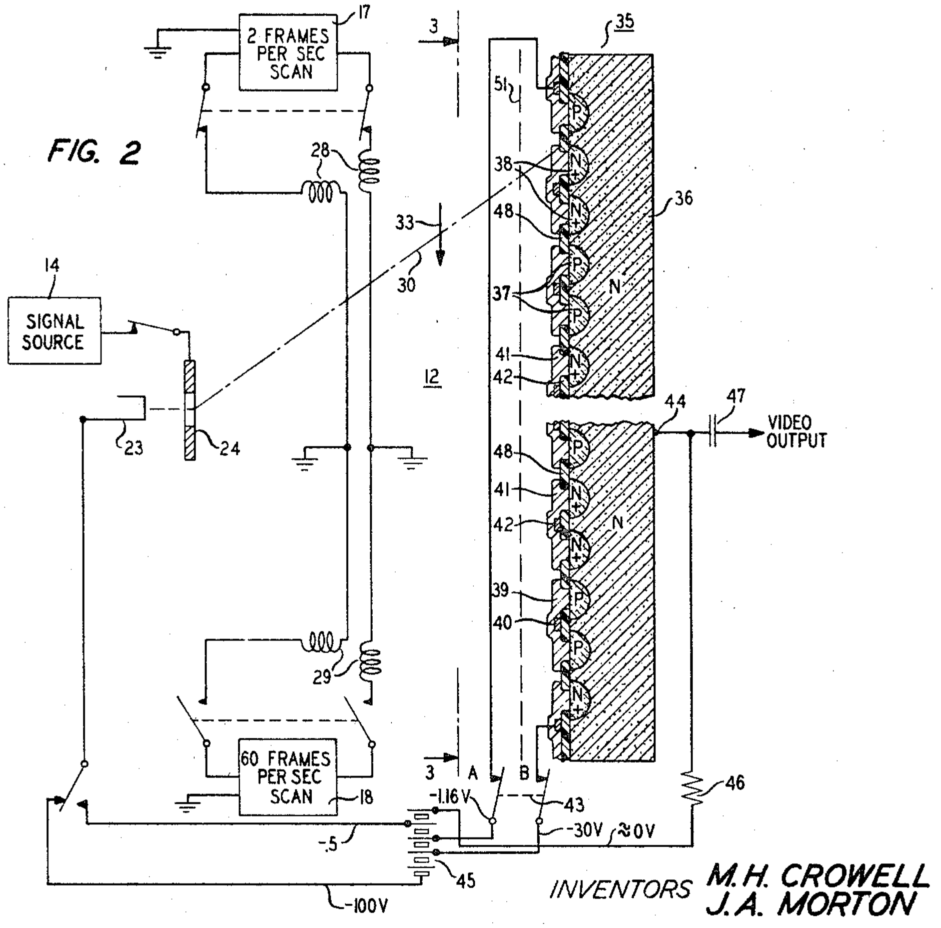
FIG. 2 is a schematic illustration of a cathode ray video storage tube in accordance with one embodiment of the invention.

FIG. 2 shows schematically the storage tube 12 when switched to record the incoming signal from source 14. Storage tube 12 includes a cathode 23, a control grid 24 and two pairs of deflection coils 28 and 29. An electron beam 30 projected from the cathode is intensity modulated by the control grid 24, under control of the signal source 14, and deflected by horizontal and vertical deflection coils 28, to scan a target structure 35 as shown by the arrow 33. The various other components of the tube such as the evacuated envelope and various electrodes have, in the interest of simplicity, not been shown.

Figure 3:
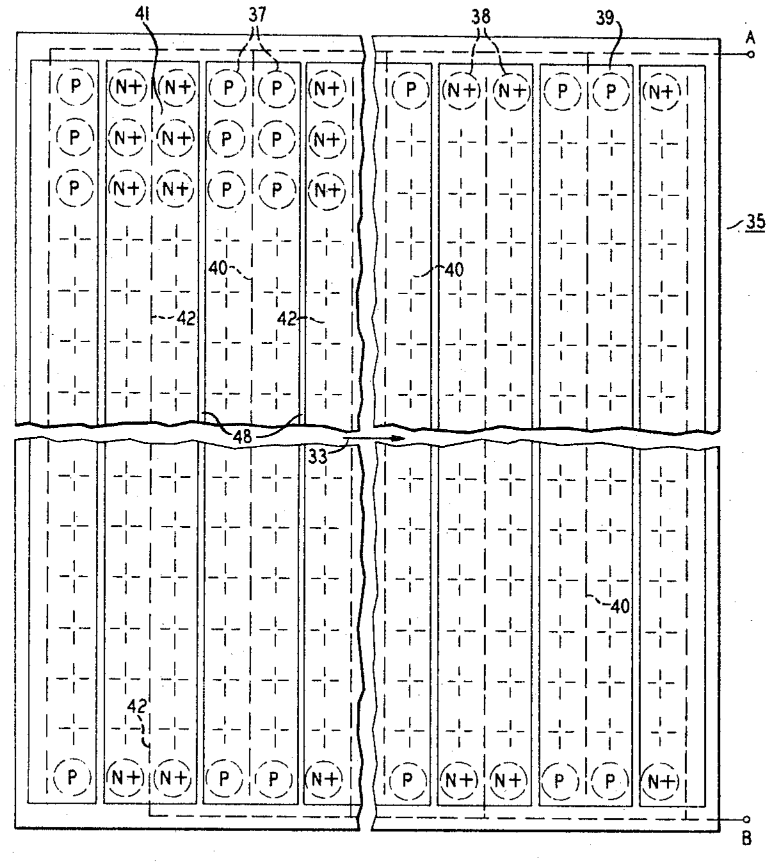
FIG. 3 is a view taken along lines 3—3 of FIG. 2.

Referring to FIGS. 2 and 3, the target structure 35 includes a semiconductor substrate 36 whose bulk is of N-type conductivity and which includes an array of P-type regions 37 and N+ regions 38 along the surface scanned by the beam. Overlaying the P regions are coatings 39 of relatively high resistance material which resistively connect the P regions to metal conductors 40. Overlaying the N+ regions are similar relatively high resistance coatings 41 which connect the N+ regions to metal conductors 42.

As shown more clearly in FIG. 3, all of the conductors 40 are connected to a common terminal A and all of the conductors 42 are connected to a common terminal B. These terminals are in turn connected by a switch 43 to a battery 45 as shown in FIG. 2. The N-type bulk or substrate 36 is connected by means of low resistance connection 44 to the battery 45 through a load resistor 46 and also to a capacitor 47 from which the video output signal is derived. Coating 48 shields the N-type substrate from the electron beam and insulates it from the resistive coatings 39 and 41, and the conductors 40 and 42.

Figure 4:
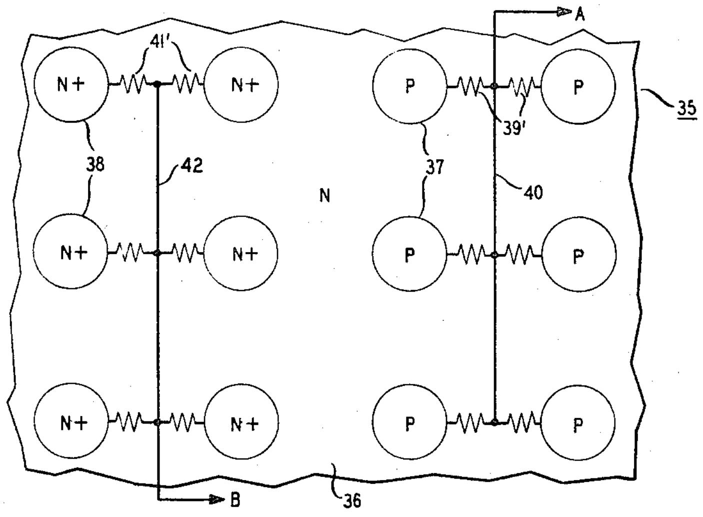
FIG. 4 is a functional schematic diagram of part of the target structure of FIG. 3.

As illustrated in the functional diagram of FIG. 4, the purpose of the resistive coatings 39 are to provide a resistance 39' between each of the P regions and the conductors 40 while the purpose of coatings 41 is to provide a resistance 41' between each of the N+ regions 38 and the conductors 42. Each adjacent pair of P and N+ regions together with the N substrate constitutes a separate PNN+ semiconductor triode element, a functional view of which is shown in FIG. 5.

Figure 5:
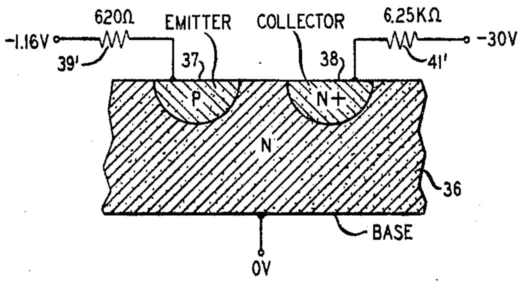
FIG. 5 is a functional schematic diagram of one of the PNN+ triode elements of FIG. 3.

A PNN+ element of the type shown in FIG. 5 is described in detail in the paper, "A Junction Transistor With High Current Gain," by J. W. Granville, Journal of Electronics, May 1956, pages 565–579. Granville explains that the resistance of the NN+ collecting junction can be drastically reduced through sufficient increase in hole injection by the P-type emitter into the N-type base. Thus, an appropriate voltage on the P-type emitter 37, for biasing the emitting junction, will result in a large current across the NN+ collecting junction and a consequent voltage drop at the N+ collector 38. By properly biasing the device it can be made to be bistable; i.e., if a positive voltage pulse above the threshold value is applied to the emitter, the high current across the NN+ junction will be maintained even after the positive pulse on the emitter is removed. The emitter voltage has different discrete values in the two stable states.

Figure 6:
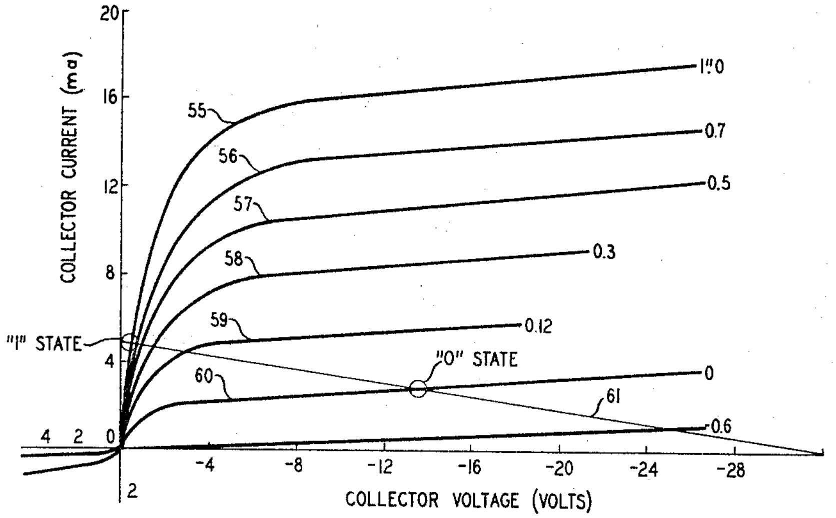
FIG. 6 is a graph of collector current versus collector voltage of the PNN+ semiconductor triode element of FIG. 5.
Figure 7:
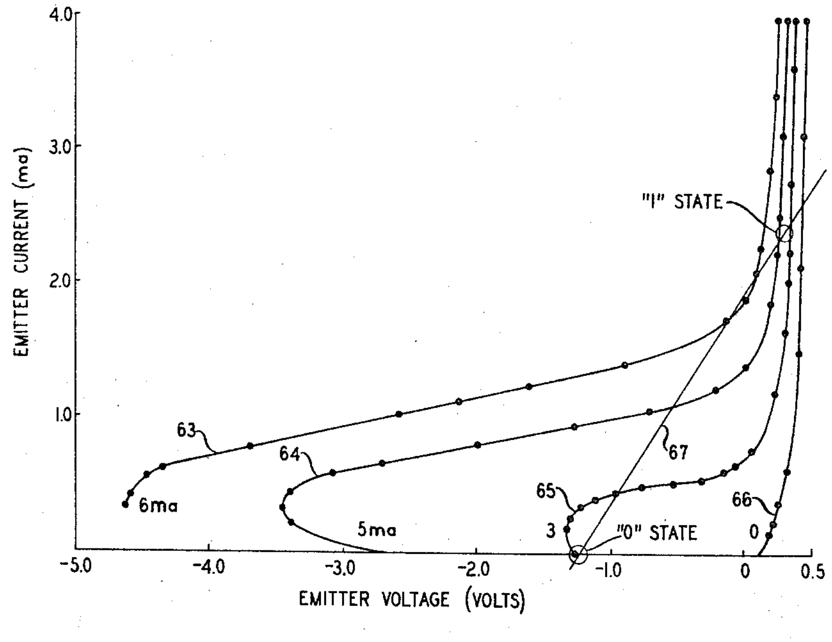
FIG. 7 is a graph of emitter current versus emitter voltage of the semiconductor triode element of FIG. 5.

The illustrative voltages and resistances shown in FIG. 5 illustrate how the semiconductor triode element is made to operate as a bistable switching transistor. When initially applied to the PNN+ transistor described by Granville, the voltages shown result in a collector bias $V_c$ of $-13.3$ volts, a collector current $I_c$ of 2.9 milliamps, an emitter bias $V_c$ of $-1.16$ volts and an emitter current $I_e$ of zero; these values constitute the "0" stable voltage state as shown in FIGS. 6 and 7. The cathode voltage of the write-in beam is chosen to give the beam a sufficiently high velocity that the secondary emission ratio of the element is greater than one; i.e., the ratio of secondary emitted electrons from the element to electrons incident on the element is greater than one. Consequently, when the beam impinges on the P-type emitter 37 it drives it to a higher positive voltage determined by the beam intensity. The resistance of resistor 41' in combination with the device resistance is sufficiently small that beam impingement on the N+ collector does not significantly affect the collector voltage.

If the beam has been modulated to a sufficiently high intensity, it will forward bias the emitter to inject holes into the base at a sufficient rate to switch the element to its other voltage state. This condition, the "1" state, is characterized by the following parameters: $I_c=4.7$ milliamps; $V_c=-0.53$ volt; $V_e=+.25$ volt; $I_e=2.4$ milliamps. These parameters can be obtained from FIGS. 6 and 7. If the electron beam has not been modulated to a sufficiently high intensity, it will not affect the voltages on the semiconductor triode element, and the element will remain in the "0" state.

Hence, as the beam scans successive PNN+ semiconductor elements, it switches them to the "1" state or leaves them in the "0" state, depending on the beam intensity at impingement. A complete scan of the target structure constitutes a "write-in" of one frame or image represented by the spatial distribution of switched PNN+ semiconductor elements. The tube electrode voltages, modulating voltage and secondary emission ratio are of course interrelated to give selective switching for write-in, and their values are matters of conventional design. The cathode voltage for write-in may typically be —100 volts, the secondary emission ratio 1.5 and the control grid bias —120 volts.

The selection of the parameters shown in FIG. 5 and described above can be appreciated from FIGS. 6 and 7, which are substantial reproductions of FIGS. 5(*b*) and 6 of the Granville paper. Curves 55, 56, 57, 58, 59 and 60 of FIG. 6 are typical collector current $I_c$ vs. collector voltage $V_c$ characteristics at emitter current $I_e$ values of 1.0, 0.7, 0.5, 0.3, 0.12, 0, and —0.6 milliamps, respectively. Curve 61 is the load line of the collector resistance 41' of 6.25 kilo-ohms. In FIG. 7 curves 63, 64, 65 and 66 are emitter current $I_e$ vs. emitter voltage $V_e$ at collector current values of 6, 5, 3 and 0 milliamps, respectively. Curve 67 is the load line of emitter resistance 39' of 620 ohms.

It can be seen that the initial emitter voltage of —1.2 volts and zero emitter current lies on load line 67 of FIG. 7 and corresponds to a collector current of 2.9 milliamps. FIG. 6 shows that at 2.9 milliamps collector current, the collector voltage is —13.3 volts on the load line 61. These parameters therefore represent a stable condition, the "0" state. The portions of curves 63–65 of FIG. 7 that have an $I_e$ current of $\approx$0.5 milliamp to $\approx$1.5 milliamps emitter voltage values in the range of 0 volts to —4.6 volts indicate that in this region the device is unstable. The only other stable condition shown on the graphs with the particular load lines used is at the points represented as the "1" state where, as mentioned above, $I_c$ is 4.7 milliamps, $V_c$ is —.53 volt, $V_e$ is +.25 volt and $I_e$ is 2.4 milliamps. Hence, it can be appreciated that the write-in electron beam must either switch each successive triode element to the "1" state, or leave it in the "0" state.

The stored information may be read out of the storage tube by scanning the target structure with a beam having a cathode voltage that is between the emitter voltage in the "1" state and the emitter voltage in the "0" state; i.e., the voltage of the cathode should in this instance be between +.25 and —1.16 volts, as for example, —0.5 volt. The read-out beam impinges the P-type emitters 37 that are in the "1" voltage state because the emitter voltage (+.25 volt) is more positive than the cathode voltage (—0.5 volt). As a result, a surge of current is directed through the N substrate and a pulse output appears across the capacitor 47 of FIG. 2. If on the other hand, an emitter 37 is in a "0" state, with a voltage of —1.16 volts, the electron beam is repelled from it and is instead collected by a secondary electron collector 51 shown in FIG. 2. Likewise, the beam never impinges on "0" state N+ regions because those regions always have a lower voltage than that of the electron beam. Thus, as the beam scans the target, it produces a video output defined by a train of pulses each representative of the "1" state of a semiconductor element as the beam impinges on it.

When the beam impinges on the emitters and collectors, it momentarily changes their voltages, but each emitter and collector voltage then reassumes its stable voltage state after the beam has left. After the beam has made its read-out scan, the voltages on all of the semiconductor elements are therefore left undisturbed and read-out has been effected without degrading the stored image or frame; i.e., the read-out is non-destructive. Hence, each stored frame may be reproduced thirty or more times by the apparatus of FIG. 1. However, since the storage device is capable of storing only two levels of information, it will not record any intensity between the two levels. After multiple read-out has been completed, the stored image can be "erased" by opening the switch 43, and then closing it to apply the original voltages and return all of the semiconductor elements to the "0" state.

Notice that during read-out, the cathode is switched to a lower bias voltage than that used during write-in. Likewise, during read-out the grid 24 is preferably switched to a lower bias voltage which in this case may be —20 volts; for simplicity, the grid bias source has not been shown. Notice also that during read-out the beam is deflected by coils 29 of FIG. 2 at a 60-frame per second rate, while during write-in it is deflected at a 2-frame per second rate. The switch 43 is operated differently than the other switches of FIG. 2 in that it connects contacts A and B to the battery during both write-in and read-out and is disengaged from the contacts only during a brief interval between read-out and write-in for the purpose of erasing the stored information.

While it is intended that switch 43 be opened automatically in synchronism with the transmitter, separate apparatus could be included for holding it closed to give continuous read-out of a single stored frame for any length of time desired. This could be used to permit a viewer to observe the stored image after the receiver has been disconnected from the transmitting party, thus reducing the cost of transmission while permitting leisurely examination of the displayed image. Appropriate apparatus for performing the various switching and biasing functions described above is a matter of conventional design.

With present technology the PNN+ semiconductor triode elements may be made with a 10 micron center-to-center spacing which will provide 1000 triode elements per centimeter. Thus, a two centimeter square target will give a resolution that is consistent with a scanning rate of 1,000 lines per frame. The semiconductor substrate may be silicon with the insulator coating 48 being silicon dioxide of a thickness of 6,000 angstroms. The high resistance layers 39 and 41 may be thin films of antimony trisulphide, titanium dioxide, silicon, or any suitable resistive film and may have a thickness on the order of one micron. The different resistances shown in FIG. 5 may be achieved by either adjusting the distances of conductors 40 and 42 from the regions 37 and 38, respectively, or by adjusting the thickness of coatings 39 and 41.

Figure 8:
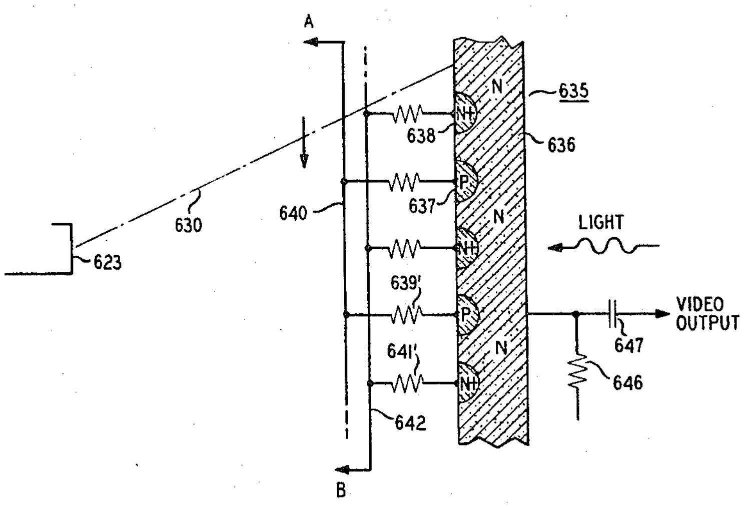
FIG. 8 is a schematic view of a television camera tube in accordance with another embodiment of the invention.

Referring to FIG. 8, there is shown schematically a camera tube version of our storage device. The structure of the target 635 is substantially the same as that of the frame repeating storage tube and comprises an N-type bulk region 636, P regions 637, and N+ regions 638. The P regions are connected by resistors 639' to conductors 640 and the N+ regions are connected by resistors 641' to conductors 642 which are shown schematically. The voltages on the various terminals may be the same as those shown in FIG. 5.

Light to be recorded is imaged in a conventional manner on the substrate 636 as indicated by the curved arrow. At locations of high light intensity a high number of electron-hole pairs are generated, with the holes diffusing toward the NN+ junctions. A sufficiently high hole density will trigger NN+ junction current thereby switching an element from the "0" to the "1" state. Hence, after exposure, the distribution of switched semiconductor elements indicates the spatial distribution of light intensity on the light emitting surface of substrate 636 and therefore constitutes an image recording.

The recorded image is read out in the same manner as that described before. The voltage on the cathode 623 is between the "0" state voltage of the P regions and the "1" state voltage, as for example, —0.5 volt. When the beam impinges on a "1" state P-type region it excites a pulse across the capacitor 647 which is taken as the video output.

It can be appreciated that by using the camera tube of FIG. 8 as the signal source of FIG. 2, the output of the camera tube is a binary signal which can be accurately stored by the storage tubes 12 and 13. The camera and storage tubes then make possible a "document mode"

television transmission system which is reliable, relatively simple, and uses a limited bandwidth while giving high resolution reproduction. Camera and storage tubes using the semiconductor target structures described are much more durable than conventional target structures because they are less susceptible to deterioration by the electron beam and are not damaged by the high temperatures required for efficient outgassing of the tube envelope during fabrication. Moreover, silicon semiconductor camera tube target structures are less susceptible to deterioration by light exposure than are conventional camera tubes. These advantages of semiconductor target structures are described in considerable detail in the aforementioned copending application of T. M. Buck et al. which also describes fabrication techniques, methods for increasing light conversion efficiency in camera tubes of this type, and other details that can be incorporated into the present embodiments.

It is to be understood that the specific embodiments described are intended to be illustrative of the principles of the invention. The specific parameters set forth in FIGS. 5, 6 and 7, of course, merely describe one example of the invention. By using different parameters, the read-out beam could be adjusted to discriminate between "0" and "1" state collector voltages, rather than emitter voltages.

The tube could be operated by the same mechanism described in the Buck et al. application by making use of the PN junction array for energy storage as is described in that application. For example, by appropriate switching, the "document mode" camera tube described above could then be operated as a conventional camera tube which uses reverse-biased diodes to reproduce numerous grey levels. This could be accomplished by simply removing the voltages to terminals A and B. The PN diodes could then be reverse-biased with the electron beam.

If so desired, $NPP^+$ transistor elements may be used to perform the same functions as the $PNN^+$ elements. In this case the substrate would be of P-type conductivity with N and $P^+$ regions along the target surface. Electron injection from the N-region or electron-hole pair generation would trigger current flow across the $PP^+$ junction for switching between voltage states as described before. As is customary in the art, the notation $P^+$ denotes a higher carrier concentration and lower resistivity than that of a P region with which it forms a junction; likewise, $N^+$ denotes a higher carrier concentration than that of an adjoining N region. In any case, the various bias voltages, doping levels, and beam voltages for giving the bistable action depicted by the graphs of FIGS. 6 and 7 are matters that can be determined by workers having ordinary skill in the art.

Since write-in can be made by light impingement on the N-type surface as shown in FIG. 8, electron beam write-in could also be made on that surface. That is, a scanning modulated electron beam having an intensity in excess of a threshold could cause sufficient hole diffusion to switch selected semiconductor elements during its scan. Hence, two electron beams could be used, one for write-in on one side of the target sheet and the other for read-out from the other side, as is disclosed in the copending application of Crowell et al., Ser. No. 645,333, filed June 12, 1967, and assigned to Bell Telephone Laboratories, Incorporated. Also, with this configuration, the P regions could be located on the write-in side of the target, and the $N^+$ regions on the read-out side.

Various other embodiments and modifications of the invention may be made without departing from the spirit and scope of the invention.

What is claimed is:

1. Storage apparatus comprising:

a target structure comprising a semiconductive sheet upon which is defined an array of semiconductor elements;

each element having a major portion of one conductivity type, a first region of the same conductivity type but of a lower resistivity than the major portion, and a second region of the opposite conductivity type;

means for biasing all of said elements at a "0" voltage state;

means for switching selected elements from the "0" voltage state to a "1" voltage state;

means for forming and projecting an electron beam;

and read-out means comprising means for scanning the target structure with said electron beam.

2. The storage apparatus of claim 1 wherein:

the switching means comprises means for scanning the target structure with an intensity modulated electron beam.

3. The storage apparatus of claim 1 wherein:

the switching means comprises means for projecting light having a varying spatial intensity distribution toward a surface of said major portion.

4. The storage apparatus of claim 1 wherein:

the read-out means electron beam is capable of impinging only on those selected elements that are in a "1" voltage state.

5. the storage device of claim 1 wherein:

the major portion is of N-type conductivity, the first region is of $N^+$-type conductivity, and the second region is of P-type conductivity.

6. The storage apparatus of claim 5 wherein:

all of the elements have a common first region which is of N-type conductivity;

the second regions are of $N^+$-type conductivity;

and the third regions are of P-type conductivity.

7. The storage apparatus of claim 5 wherein:

the input switching means comprises means for intensity modulating the electron beam with a signal and means for scanning the array of elements with the intensity modulated beam at a relatively low frame rate; and the read-out means comprises means for scanning the array with a substantially unmodulated beam at a relatively high frame rate.

8. The storage tube of claim 7 wherein:

the surface portions of the first array and the surface portions of the second array are arranged in rows;

means comprising a first coating of resistive material overlaying each row of the first array for interconnecting the surface portions of the first array;

and means comprising second coatings of resistive material overlaying each row of the second array for interconnecting the surface portions of the second array.

9. The storage device of claim 8 further comprising:

means connected to the N-type region of each element for biasing it at a prescribed D-C voltage;

means for biasing each P-type region comprising a first resistance associated with each P-type region, all of said first resistances being connected to a D-C voltage source;

and the $N^+$ biasing means comprises a second resistance associated with each $N^+$ region, all of the second resistances being connected to a D-C voltage source.

10. The storage device of claim 8 wherein:

the input switching means comprises means for scanning the first surface with an electron beam which is intensity modulated to be of high or low intensity states;

the intensity of the beam in the high intensity state causing enough secondary emission from any P-type regions upon which it impinges to drive such P-type region to a sufficiently high positive voltage to switch the corresponding $N^+$ region to the second stable voltage;

the intensity of the beam in the low intensity state being insufficiently high to cause enough secondary emission from any P-type region it impinges to switch the corresponding P and $N^+$ region voltages.

11. The storage device of claim 10 further comprising:

a plurality of first conductors overlaying the first surface of the elements;

the first resistances comprise a coating of semiconductor material interconnecting the P-type regions and the first conductors;

a plurality of second conductors overlaying the elements;

and the second resistances comprising a coating of semiconductor material interconnecting the $N^+$-type regions and the second conductors.

12. The storage device of claim 8 wherein:

the input switching means comprises means for projecting light of varying spatial intensity toward a surface of the N regions, at least part of said light having sufficient intensity to produce holes at a sufficient rate in an N region to switch the respective $N^+$ and P regions to the second voltages.

13. The storage device of claim 12 wherein:

the first resistances are larger than the second resistances, whereby the impinging electron beam is capable of changing the voltages on the P-type regions to a greater extent than the $N^+$-type regions.

14. Storage apparatus comprising:

an array of semiconductor elements each having a first region of a first conductivity type, a second region of the first conductivity type but of a lower resistivity than the first region, and a third region of a second conductivity type;

each of said elements being bistable, and being capable of maintaining either a high or a low voltage on the third region with respect to the first region;

the voltage of the third region being switchable in response to an injection of minority carriers at a sufficient rate into the first region near the junction of the first region and the second region;

input means for switching the voltage of third regions of selected elements;

means including a cathode for forming and projecting an electron beam;

read-out means for causing said electron beam to scan the array of elements;

means for biasing the cathode at a voltage that is between said high and low voltages of the third regions, whereby the beam impinges only on selected third regions;

and means for deriving an output pulse in response to beam impingement on any of the third regions.

15. A storage tube for storing binary digits comprising:

a target structure comprising a semiconductive sheet, the bulk of the sheet being of one conductivity type, the sheet including a first array of surface portions of the same conductivity type but of a lower resistivity and a second array of surface portions of the opposite conductivity type arranged such that adjacent pairs of surface portions, one from the first array and the other from the second array, form a bistable transistor;

means for forming and projecting an electron beam for scanning the surface of the target structure including the first and second arrays; and means for shielding the bulk portion of the target structure surface from the electron beam.

16. Storage apparatus comprising:

a target structure comprising an array of semiconductor elements;

each element having regions of N-type conductivity, P-type conductivity, and $N^+$-type conductivity, the $N^+$ region being located on a first surface thereof and forming an $NN^+$ junction with the N region;

means for biasing the $N^+$ regions and the P regions at first stable voltages with respect to the N regions;

input means for switching the $N^+$ regions and P regions of selected elements to second stable voltages that are each more positive than the corresponding first voltages;

said input means comprising means for producing holes in selected N regions at a sufficient rate to induce a substantial current across the respective $NN^+$ junction;

and means for scanning the first surfaces of the elements with an electron beam comprising a cathode having a voltage that is more negative than the first voltages and is capable of impinging only on elements that have been switched to the second voltages.

References Cited

UNITED STATES PATENTS

| | | | |
|---|---|---|---|
| 3,011,089 | 11/1961 | Reynolds | 315—10 |
| 3,252,030 | 5/1966 | Cawein | 313—66 |
| 3,322,955 | 5/1967 | Desvignes | 313—66 X |

RODNEY D. BENNETT, *Primary Examiner.*

M. F. HUBLER, *Assistant Examiner.*

U.S. Cl. X.R.

315—11; 313—67